(12) United States Patent
Jing et al.

(10) Patent No.: US 12,539,839 B2
(45) Date of Patent: Feb. 3, 2026

(54) DCDC OUTPUT VOLTAGE CONTROL METHOD AND CONTROL SYSTEM FOR HYBRID ELECTRIC VEHICLE

(71) Applicants: NINGBO GEELY ROYAL ENGINE COMPONENTS CO., LTD, Zhejiang (CN); AUROBAY TECHNOLOGY CO., LTD., Zhejiang (CN); ZHEJIANG GEELY HOLDING GROUP CO., LTD, Zhejiang (CN)

(72) Inventors: Junchao Jing, Zhejiang (CN); Yiqiang Liu, Zhejiang (CN); Weishan Huang, Zhejiang (CN); Jun Yang, Zhejiang (CN); Xuemei Yu, Zhejiang (CN); Ruiping Wang, Zhejiang (CN); Ingo Scholten, Zhejiang (CN)

(73) Assignees: NINGBO GEELY ROYAL ENGINE COMPONENTS CO., LTD., Ningbo (CN); AUROBAY TECHNOLOGY CO., LTD., Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 290 days.

(21) Appl. No.: 18/287,920

(22) PCT Filed: Aug. 10, 2021

(86) PCT No.: PCT/CN2021/111719
§ 371 (c)(1),
(2) Date: Oct. 23, 2023

(87) PCT Pub. No.: WO2023/015433
PCT Pub. Date: Feb. 16, 2023

(65) Prior Publication Data
US 2024/0190413 A1 Jun. 13, 2024

(51) Int. Cl.
*B60L 50/16* (2019.01)
*B60W 10/30* (2006.01)

(52) U.S. Cl.
CPC .............. *B60W 10/30* (2013.01); *B60L 50/16* (2019.02); *B60L 2210/12* (2013.01); *B60L 2210/14* (2013.01)

(58) Field of Classification Search
CPC ..... B60W 10/30; B60L 50/16; B60L 2210/12; B60L 2210/14
See application file for complete search history.

(56) References Cited

U.S. PATENT DOCUMENTS

2011/0025127 A1   2/2011   Choi et al.
2017/0062876 A1*  3/2017   Narla ................... B60L 3/0046
(Continued)

FOREIGN PATENT DOCUMENTS

CN   104228819 A   12/2014
CN   105584474 A   5/2016
(Continued)

OTHER PUBLICATIONS

First Office Action issued in counterpart Chinese Patent Application No. 202180004525.0, dated Jun. 18, 2025.
(Continued)

*Primary Examiner* — Edwin A Young
(74) *Attorney, Agent, or Firm* — Westbridge IP LLC

(57) ABSTRACT

A DCDC output voltage control method and control system for a hybrid electric vehicle are provided. The method includes: when a DCDC converter is in a buck operation mode, determining whether the vehicle is in a high power output demand state or an abnormal engine flame-out state; if so, setting the output voltage of the DCDC converter to a normal target voltage; otherwise, determining whether a low-voltage load has a charging voltage boost demand, and
(Continued)

when the low-voltage load has the charging voltage boost demand and the power of a high-voltage battery is greater than a power threshold, setting the output voltage of the DCDC converter according to the voltage level corresponding to the charging voltage boost demand, to meet the charging demand of the low-voltage load. The fuel economy of a hybrid power assembly system can be optimized.

16 Claims, 3 Drawing Sheets

(56) References Cited

U.S. PATENT DOCUMENTS

| | | | | |
|---|---|---|---|---|
| 2017/0297440 | A1* | 10/2017 | Hu | H02M 3/04 |
| 2020/0079231 | A1 | 3/2020 | Song | |
| 2021/0006066 | A1* | 1/2021 | Takemoto | H02M 1/36 |

FOREIGN PATENT DOCUMENTS

| | | |
|---|---|---|
| CN | 205554092 U | 9/2016 |
| CN | 109080560 A | 12/2018 |
| CN | 111114324 A | 5/2020 |
| CN | 112583068 A | 3/2021 |
| JP | 2010136509 A | 6/2010 |
| KR | 20160053504 A | 5/2016 |
| KR | 20160086567 A | 7/2016 |

OTHER PUBLICATIONS

Chinese Intellectual Property Office (ISR/CN), "International Search Report for PCT/CN2021/111719", China, May 5, 2022.
EPO, "Supplementary European Search Report for EP Application No. 21873706.2", Hague, Germany, Jan. 16, 2023.
EPO, "2nd EP Office Action for EP Application No. 21873706.2", Europe, Jul. 11, 2023.

* cited by examiner

DCDC OUTPUT VOLTAGE CONTROL METHOD AND CONTROL SYSTEM FOR HYBRID ELECTRIC VEHICLE

CROSS-REFERENCE TO RELATED PATENT APPLICATION

This application is a U.S. national stage application of PCT Patent Application No. PCT/CN2021/111719 filed Aug. 10, 2021, which is incorporated herein in its entirety by reference.

FIELD OF THE INVENTION

The present invention relates to the technical field of vehicle electronics, and in particular, to a DCDC output voltage control method and control system for a hybrid electric vehicle.

BACKGROUND OF THE INVENTION

For a hybrid electric vehicle, a voltage converter DCDC supplies power to low-voltage electrical loads of the whole vehicle, the low-voltage electrical loads including a 12 V battery, an engine ignition coil, a fuel injector, instruments, a central control display screen, all controllers, etc. For a traditional non-hybrid electric vehicle, an intelligent generator supplies power to the low-voltage loads.

For a traditional vehicle equipped with an ordinary generator, an engine drives the generator by means of a belt to generate power at a constant voltage, which is not conducive to improving the economy of the engine. For a traditional vehicle equipped with an intelligent generator, an engine ECU can flexibly adjust a generating voltage of the generator according to the operating condition of the vehicle and the engine and the state of the battery, to achieve the purpose of flexibly adjusting the load of the generator under different conditions, thereby optimizing the fuel economy of the engine.

For the hybrid electric vehicle, the traditional generator driven by a belt is usually eliminated. Instead, a hybrid motor generates power to charge a high-voltage battery system, and then a DCDC converts high-voltage direct current into low-voltage power required by a low-voltage power supply circuit. The DCDC can also quickly adjust its output voltage within a certain range. In order to achieve the purpose of optimizing the fuel economy of a hybrid power assembly system, the output voltage of DCDC needs to be adjusted by a special control strategy.

BRIEF DESCRIPTION OF THE INVENTION

In view of the above problems, the present invention is proposed to provide a DCDC output voltage control method and control system for a hybrid electric vehicle, which overcomes the above problems or solves at least some of the above problems.

An object of a first aspect of the present invention is to provide a DCDC output voltage control method for a hybrid electric vehicle, which can optimize the fuel economy of a hybrid power assembly system.

Another object of the first aspect of the present invention is to ensure the basic operation of the vehicle.

An object of a second aspect of the present invention is to provide a DCDC output voltage control system for implementing the above control method, which can optimize the fuel economy of a hybrid power assembly system.

In particular, according to a first aspect of the embodiments of the present invention, provided is a DCDC output voltage control method for a hybrid electric vehicle, the vehicle including a DCDC converter for converting the voltage of a high-voltage battery into a low voltage used for a low-voltage load of the vehicle in a buck operation mode and outputting the low voltage, the method including:

when the DCDC converter is in the buck operation mode, determining whether the vehicle is in a high power output demand state or an abnormal engine flame-out state;

if so, setting an output voltage of the DCDC converter to a normal target voltage, so as to control the DCDC converter to output according to the normal target voltage; and otherwise, determining whether the low-voltage load has a charging voltage boost demand, and when the low-voltage load has the charging voltage boost demand and the electric quantity of the high-voltage battery is greater than an electric quantity threshold, setting the output voltage of the DCDC converter according to a voltage level corresponding to the charging voltage boost demand, so as to meet a charging demand of the low-voltage load.

Optionally, before the step of, when the DCDC converter is in the buck operation mode, determining whether the vehicle is in a high power output demand state or an abnormal engine flame-out state, the method further includes:

determining whether the vehicle is in a DCDC enable state; and when the vehicle is in the enable state and receives a buck request instruction, controlling the DCDC converter to prepare for voltage conversion, performing timing, and controlling the DCDC converter to switch to the buck operation mode when the time arrives at a preset delay time.

Optionally, the step of determining whether the vehicle is in a DCDC enable state includes:

determining that the DCDC converter is in a pre-enable state when the high-voltage battery of the vehicle is in a state of being able to supply power, the vehicle receives a start request instruction, the high-voltage battery is in a state of being able to maintain a preset electric quantity, the DCDC converter is in a state of being able to normally transmit and receive signals, and a high-voltage system is not faulty; and determining that the DCDC converter is in the enable state when the DCDC converter is in the pre-enable state, an ignition signal is received and it is determined that a motor of the vehicle is not faulty.

Optionally, the high power output demand state includes at least one of an initiation start state, a full-throttle acceleration state, an operating high-throttle start state and a crawling start in-gear state.

Optionally, the step of determining whether the vehicle is in a high power output demand state includes:

determining that the vehicle is in the initiation start state when, in a same driving cycle, a first start time of an engine of the vehicle is less than a first limit or a non-first start time thereof is less than a second limit, wherein the first limit is greater than the second limit.

Optionally, the step of determining whether the vehicle is in a high power output demand state includes:

determining that the vehicle is in the full-throttle acceleration state when the opening of a throttle pedal of the vehicle is greater than a first opening limit, the vehicle is in a forward gear or a reverse gear, and the time when the opening of the throttle pedal is greater than the first opening limit is less than a third limit.

Optionally, the step of determining whether the vehicle is in a high power output demand state includes:

determining that the vehicle is in the operating high-throttle start state when the engine of the vehicle is in an operating state, a vehicle speed is less than a starting vehicle speed threshold, a reserve torque of the engine is less than a torque threshold, the opening of the throttle pedal of the vehicle is greater than a second opening limit, a difference between a maximum torque of the engine and a driver request torque is less than a difference threshold, and a current power of an air condition compressor is greater than a power limit.

Optionally, the step of determining whether the vehicle is in a high power output demand state includes:

determining that the vehicle is in the crawling start in-gear state when the engine of the vehicle is in the operating state, a starting time is less than a fourth limit, the vehicle speed is less than the starting vehicle speed threshold, the reserve torque of the engine is less than the torque threshold, opening information of the throttle pedal is not received, and the vehicle is in the forward gear or the reverse gear.

Optionally, the step of determining whether the vehicle is in an abnormal engine flame-out state includes:

determining that the vehicle is in the abnormal engine flame-out state when the engine of the vehicle is in the operating state, a rotation speed of the engine is less than a target idle speed and the absolute value of a difference between the two is greater than a rotation speed difference limit, a rotation speed acceleration of the engine is negative and the absolute value of the rotation speed acceleration is less than an acceleration limit, and a predicted rotation speed of the engine is less than a flame-out rotation speed threshold.

Optionally, the step of determining whether the low-voltage load has a charging voltage boost demand includes:

determining whether a catalytic converter of the vehicle is in a rapid heating demand state;

determining whether an oil pump of the vehicle is in a high load demand state;

determining whether a fan of the vehicle is in a high load state; and determining that the low-voltage load has the charging voltage boost demand when one or more conditions of the catalytic converter being in the rapid heating demand state, the oil pump being in the high load demand state, and the fan being in the high load state occur.

Optionally, the step of determining whether a catalytic converter of the vehicle is in a rapid heating demand state includes:

determining that the catalytic converter is in the rapid heating demand state when the temperature of a coolant in the engine of the vehicle is higher than a temperature threshold, an upstream exhaust temperature of the catalytic converter is reliable, and the exhaust temperature is lower than an air temperature threshold.

Optionally, the step of determining whether an oil pump of the vehicle is in a high load demand state includes:

determining that the oil pump is in the high load demand state when a load of the oil pump is greater than a load threshold.

Optionally, the step of determining whether a fan of the vehicle is in a high load state includes: determining that the fan is in the high load state when an opening of the fan is greater than an opening threshold.

Optionally, the step of setting the output voltage of the DCDC converter according to a voltage level corresponding to the charging voltage boost demand includes:

controlling the DCDC converter to output a voltage according to the voltage level corresponding to the occurring condition when one of the conditions of the catalytic converter being in the rapid heating demand state, the oil pump being in the high load demand state, and the fan being in the high load state occurs; and controlling the DCDC converter to output a voltage according to a highest voltage level among the voltage levels corresponding to the occurring conditions when at least two of the conditions of the catalytic converter being in the rapid heating demand state, the oil pump being in the high load demand state, and the fan being in the high load state occur.

Optionally, the voltage level corresponding to the catalytic converter being in the rapid heating demand state is lower than the voltage level corresponding to the oil pump being in the high load demand state; and the voltage level corresponding to the oil pump being in the high load demand state is the same as the voltage level corresponding to the fan being in the high load state.

In particular, according to a second aspect of the embodiments of the present invention, provided is a DCDC output voltage control system for a hybrid electric vehicle, including a control unit, the control unit including a memory and a processor, and the memory storing a control program that, when executed by the processor, is used to implement the DCDC output voltage control method according to any one of the above.

The DCDC converter of the present invention determines the charging demand of the low-voltage load when the vehicle is neither in a high power output demand state nor in an abnormal engine flame-out state. If the low-voltage load has a charging voltage boost demand and the electric quantity of the high-voltage battery is greater than an electric quantity threshold at this time, a corresponding output voltage is set according to the voltage level corresponding to the specific situation of the charging voltage boost demand. However, when the vehicle is in the high power output demand state or the abnormal engine flame-out state, the output voltage of the DCDC converter will not be boosted. That is, the setting mode of the output voltage of the DCDC converter is specifically defined. The output voltage of the DCDC converter is controlled and adjusted according to the operating state of the vehicle and the low-voltage load, which can optimize the fuel economy of a hybrid power assembly system.

Further, the setting of the output voltage of the DCDC converter according to the voltage level corresponding to the charging voltage boost demand can meet the charging demand of the low-voltage load under different charging voltage boost demands, which further ensures the fuel economy of the vehicle.

Further, in present invention, when the vehicle is in the high power output demand state or the abnormal engine flame-out state, a request for reducing the power of the low-voltage load is further sent, thereby reducing the power consumption of the low-voltage load as much as possible when the vehicle is in the high power output demand state or the abnormal engine flame-out state, and ensuring the basic operation of the vehicle.

The above description is only an overview of the technical solution of the present invention. To understand more clearly the technical means of the present invention, to implement in accordance with the contents of the specification, and to make the above and other purposes, features and advantages of the present invention more apparent and understandable, specific embodiments of the present invention are described below.

According to the detailed description of specific embodiments of the present invention in combination with drawings, the above and other objects, advantages and features of the present invention will be better understood by those skilled in the art.

BRIEF DESCRIPTION OF THE DRAWINGS

Hereinafter, some specific embodiments of the present invention will be described in detail in an exemplary and non-limiting manner with reference to the drawings. Identical reference numerals in the drawings indicate identical or similar components or parts. It should be understood by those skilled in the art that these drawings are not necessarily drawn to scale. In the drawings.

DETAILED DESCRIPTION

Figure 1:
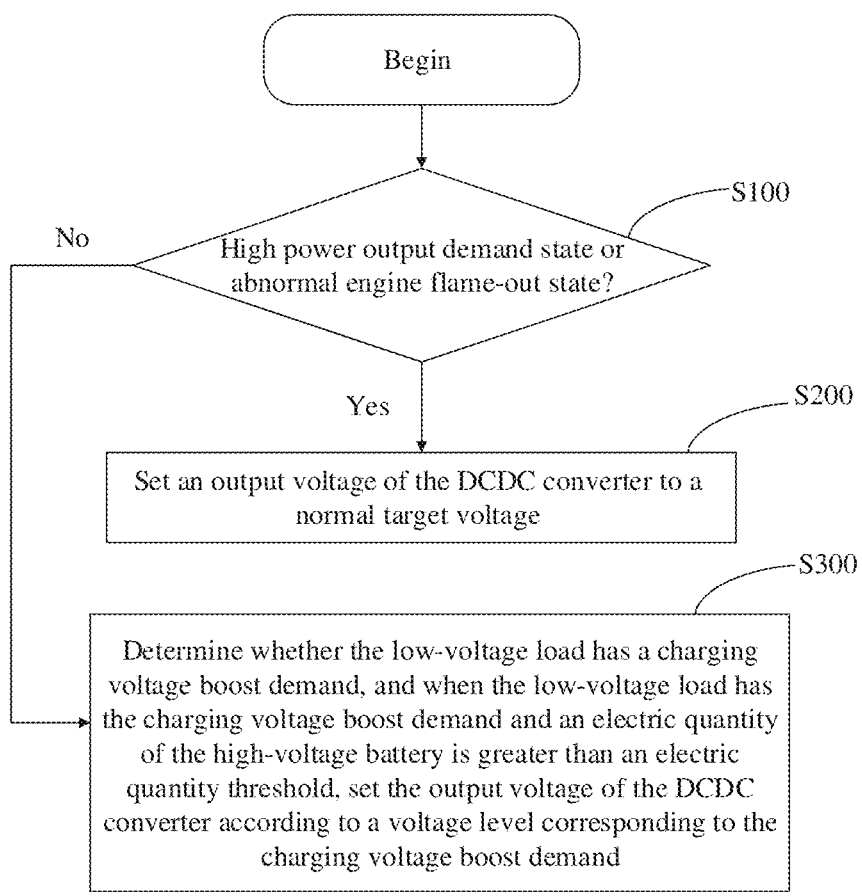
FIG. 1 is a flowchart of a DCDC output voltage control method according to an embodiment of the present invention.

Exemplary embodiments of the present disclosure will be described in greater detail below with reference to the drawings. Although exemplary embodiments of the present disclosure are shown in the drawings, it should be understood that the present disclosure can be implemented in various forms and should not be limited to the embodiments elaborated herein. On the contrary, these embodiments are provided to enable a more thorough understanding of the present disclosure and to enable the complete scope of the present disclosure to be communicated to those skilled in the art.

FIG. 1 is a flowchart of a DCDC output voltage control method according to an embodiment of the present invention. The DCDC output voltage control method of the present invention is used in a hybrid electric vehicle, the vehicle including a DCDC converter for converting the voltage of a high-voltage battery into a low voltage used for a low-voltage load of the vehicle in a buck operation mode and outputting the low voltage. As shown in FIG. 1, in an embodiment, the method includes:

Step S100, when the DCDC converter is in the buck operation mode, whether the vehicle is in a high power output demand state or an abnormal engine flame-out state is determined, and if so, step S200 is performed, otherwise, step S300 is performed.

Step S200, an output voltage of the DCDC converter is set to a normal target voltage, so as to control the DCDC converter to output according to the normal target voltage. Generally, the normal target voltage is a voltage value between 12.2 V and 15 V, which is specifically set according to an SOC and charge and discharge current of a 12V battery.

Step S300, whether the low-voltage load has a charging voltage boost demand is determined, and when the low-voltage load has the charging voltage boost demand and an electric quantity of the high-voltage battery is greater than an electric quantity threshold, the output voltage of the DCDC converter is set according to a voltage level corresponding to the charging voltage boost demand, so as to meet a charging demand of the low-voltage load. The electric quantity threshold here is an electric quantity value that can boost the DCDC output voltage. For example, when the SOC of the high-voltage battery is greater than 32%, the DCDC converter is allowed to boost the output voltage.

The DCDC converter of this embodiment determines the charging demand of the low-voltage load when the vehicle is neither in a high power output demand state nor in an abnormal engine flame-out state. If the low-voltage load has a charging voltage boost demand and the electric quantity of the high-voltage battery is greater than an electric quantity threshold at this time, a corresponding output voltage is set according to the voltage level corresponding to the specific situation of the charging voltage boost demand. However, when the vehicle is in the high power output demand state or the abnormal engine flame-out state, the output voltage of the DCDC converter will not be boosted. That is, the setting mode of the output voltage of the DCDC converter is specifically defined. The output voltage of the DCDC converter is controlled and adjusted according to the operating state of the vehicle and the low-voltage load, which can optimize the fuel economy of a hybrid power assembly system.

Further, the setting of the output voltage of the DCDC converter according to the voltage level corresponding to the charging voltage boost demand can meet the charging demand of the low-voltage load under different charging voltage boost demands, which further ensures the fuel economy of the vehicle.

Figure 2:
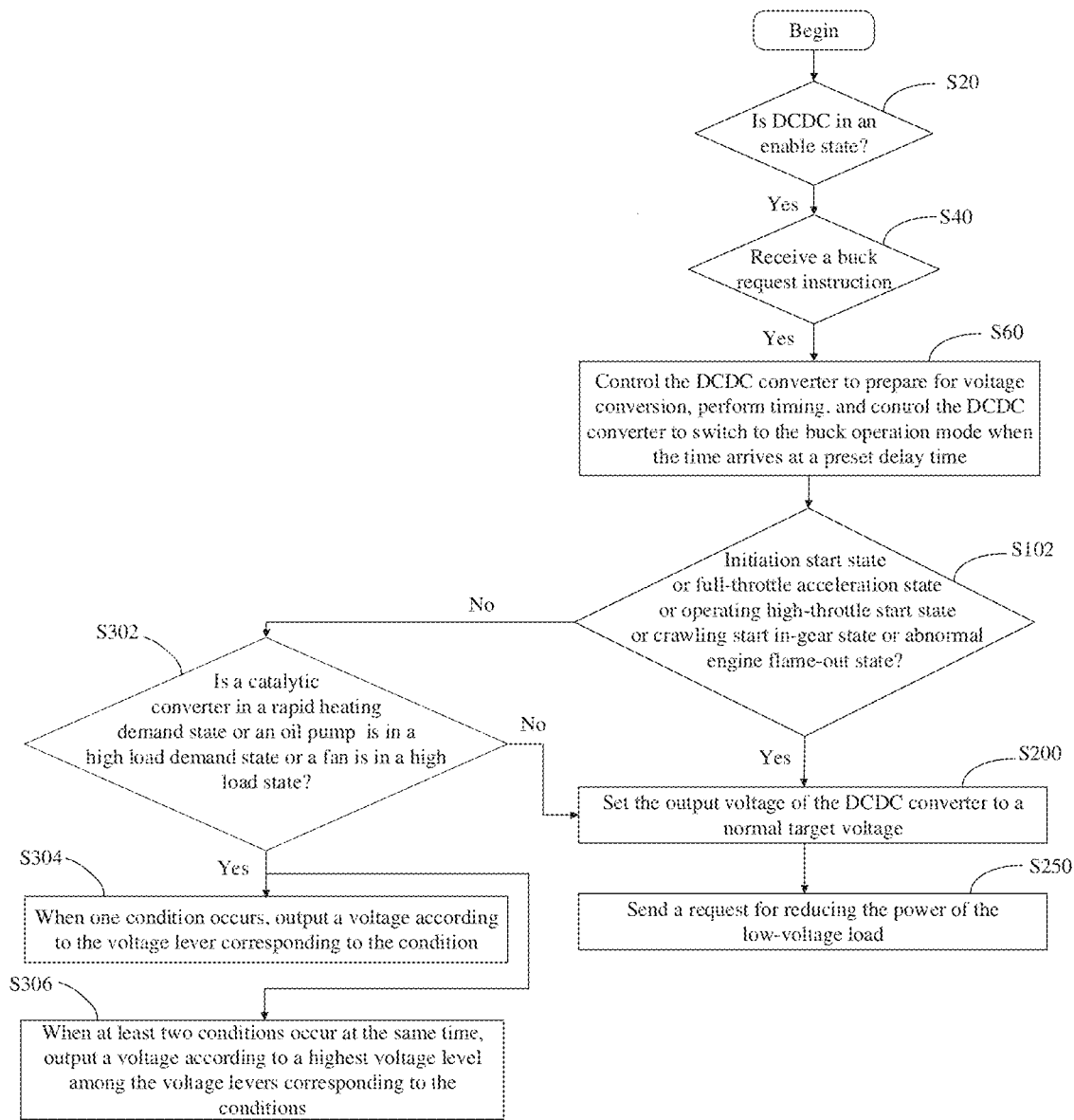
FIG. 2 is a flowchart of a DCDC output voltage control method according to another embodiment of the present invention.

FIG. 2 is a flowchart of a DCDC output voltage control method according to another embodiment of the present invention. In another embodiment, as shown in FIG. 2, before step S100, the method further includes:

Step S20, whether the vehicle is in a DCDC enable state is determined, and if so, step S40 is performed.

Step S40, whether a buck request instruction is received is determined, and if so, step S60 is performed.

Step S60, the DCDC converter is controlled to prepare for voltage conversion, timing is performed, and the DCDC converter is controlled to switch to the buck operation mode when the time arrives at a preset delay time.

In this embodiment, when the vehicle is in the DCDC enable state and receives the buck request instruction, the vehicle enters a delay state, that is, the DCDC converter will not immediately enter the buck operation mode, but will delay for a period of time to boost the voltage and prepare for voltage conversion. As soon as the delay time comes, the state of the DCDC converter is transitioned to the buck operation mode. Of course, there should be no fault to prohibit voltage conversion during this process. Once such a fault occurs, for example, the hardware of the DCDC converter crashes, the DCDC converter stops operating, so as to ensure the normal conversion of voltage. In this embodiment, the configuration of the delay state can ensure that the DCDC converter has prepared for voltage conversion when entering the buck operation mode, thereby ensuring the smooth progress of the buck operation.

In a further embodiment, step S20 includes a process of determining a pre-enable state and an enable state. It is determined that the DCDC converter is in the pre-enable state when the high-voltage battery of the vehicle is in a state of being able to supply power, the vehicle receives a start request instruction, the high-voltage battery is in a state of being able to maintain a preset electric quantity, the DCDC converter is in a state of being able to normally transmit and receive signals, and a high-voltage system is not faulty. Optionally, it is determined that the high-voltage battery is in the state of being able to supply power when an engine electronic control module (ECM) of the vehicle has sent a request for pull-in of a main relay of the high-voltage battery to a power battery energy control module (BECM) and the ECM has received information fed back by the BECM that the main relay of the high-voltage battery has been pulled in. Optionally, the start request instruction is a start request input by a driver or a remote start request. At this time, the vehicle is in a state where some low-voltage accessories are powered on but not turned on. Optionally, when the situations of a too low SOC (for example, an SOC is less than 25%) and incapability of being charged, or being in high current consumption (for example, the current consumption is greater than 1 A) do not happen to the high-voltage battery, it is determined that the high-voltage battery is in the state of being able to maintain preset electric quantity. Optionally, when neither the situation that the relay of the high-voltage battery has been requested to be pulled in for a certain time but DCDC enable cannot be requested, nor the situation that the DCDC enable has been requested but DCDC cannot be enabled (which may be determined according to DCDC feedback signals) occurs, the DCDC converter is in the state of being able to normally transmit and receive signals.

When the DCDC converter is in the pre-enable state, if an ignition signal (KL15 power-on) is received and it is determined that a motor of the vehicle is not faulty, it is determined that the DCDC converter is in the enable state, that is, the DCDC enable state.

This embodiment defines the DCDC enable state. At this time, the DCDC converter is in a state where it has been powered on and can normally transmit and receive signals, that is, an initial state where a voltage conversion request has not been received.

In an embodiment, the high power output demand state includes at least one of an initiation start state, a full-throttle acceleration state, an operating high-throttle start state and a crawling start in-gear state. That is, the step of determining whether the vehicle is in a high power output demand state or an abnormal engine flame-out state in step S100 includes:

Step S102, it is determined whether the vehicle is in at least one of the initiation start state, the full-throttle acceleration state, the operating high-throttle start state, the crawling start in-gear state, and the abnormal engine flame-out state.

In an embodiment, it is determined that the vehicle is in the initiation start state when, in a same driving cycle, a first start time of the engine of the vehicle is less than a first limit or a non-first start time thereof is less than a second limit, wherein the first limit is greater than the second limit. Optionally, the first limit is any value between 10 s and 20 s, and the second limit is any value within 5 to 10 s. Because the power consumption for the first start is higher, the first limit should be set larger.

When the vehicle is in the initiation start state, the power consumption is relatively high, so the power consumption of the load needs to be reduced, and the event that the DCDC converter boosts the output voltage cannot be triggered.

In an embodiment, it is determined that the vehicle is in the full-throttle acceleration state when the opening of a throttle pedal of the vehicle is greater than a first opening limit, the vehicle is in a forward gear or a reverse gear, and the time when the opening of the throttle pedal is greater than the first opening limit is less than a third limit. The first opening limit is defined as a full-throttle acceleration limit of the vehicle, that is, when the opening of the throttle pedal is greater than the first opening limit, it indicates that the vehicle has a demand for full-throttle acceleration.

In an embodiment, it is determined that the vehicle is in the operating high-throttle start state when the engine of the vehicle is in an operating state, a vehicle speed is less than a starting vehicle speed threshold, a reserve torque of the engine is less than a torque threshold, the opening of the throttle pedal of the vehicle is greater than a second opening limit, a difference between a maximum torque of the engine and a driver request torque is less than a difference threshold, and a current power of an air condition compressor is greater than a power limit. The reserve torque is a difference between the maximum torque and a current actual torque of the engine. Optionally, the vehicle speed threshold is 20 kph, the second opening limit is 5%, the difference threshold is 50 Nm, and the torque threshold is any value between 50 and 100 Nm. The difference between the maximum torque of the engine and the driver request torque being less than the difference threshold indicates that the driver request torque is close to the maximum torque of the engine.

In an embodiment, it is determined that the vehicle is in the crawling start in-gear state when the engine of the vehicle is in the operating state, a starting time is less than a fourth limit, the vehicle speed is less than the starting vehicle speed threshold, the reserve torque of the engine is less than the torque threshold, opening information of the throttle pedal is not received, and the vehicle is in the forward gear or the reverse gear. Optionally, the fourth limit is 1000 s. When the vehicle is in the crawling start in-gear state, cold engine speed drop easily occurs. At this time, the DCDC converter should be prohibited to boost the output voltage.

In an embodiment, it is determined that the vehicle is in the abnormal engine flame-out state when the engine of the vehicle is in the operating state, a rotation speed of the engine is less than a target idle speed and the absolute value of a difference between the two is greater than a rotation speed difference limit, a rotation speed acceleration of the engine is negative and the absolute value of the rotation speed acceleration is less than an acceleration limit, and a predicted rotation speed of the engine is less than a flame-out rotation speed threshold. Optionally, the target idle speed is 400 rpm, the acceleration limit is 5 rpm/s, and the flame-out rotation speed threshold is 500 rpm. Here, the predicted rotation speed of the engine refers to a next rotation speed predicted according to a current rotation speed and the rotation speed acceleration.

In another embodiment, when the vehicle is in the high power output demand state or the abnormal engine flame-out state, the method further includes:

Step S250, a request for reducing the power of the low-voltage load is sent. For example, some accessories are controlled to close, the opening of a fan is reduced, the power of an air conditioner is reduced, etc., so as to reduce the power consumption of the low-voltage load as much as possible when the vehicle is in the high power output demand state or the abnormal engine flame-out state, thereby ensuring the basic operation demand of the vehicle.

As shown in FIG. 2, the step of determining whether the low-voltage load has a charging voltage boost demand in step S300 includes:

Step S302, whether one of the conditions of a catalytic converter of the vehicle being in a rapid heating demand state, an oil pump of the vehicle being in a high load demand state, and a fan of the vehicle being in a high load state occurs is determined, and if so, it is determined that the low-voltage load has the charging voltage boost demand.

In an embodiment, it is determined that the catalytic converter is in the rapid heating demand state when the temperature of a coolant in the engine of the vehicle is higher than a temperature threshold, an upstream exhaust temperature of the catalytic converter is reliable, and the exhaust temperature is lower than an air temperature threshold. Optionally, the temperature threshold is 18°, and the air temperature threshold is 170°. Whether the exhaust temperature is reliable can be determined by the accuracy of signals. When the catalytic converter is in the rapid heating demand state, the temperature of the catalytic converter needs to rise faster to ensure vehicle emissions.

In an embodiment, when the load of the oil pump is greater than a load threshold, it is determined that the oil pump is in the high load demand state.

In an embodiment, when the opening of the fan is greater than an opening threshold, it is determined that the fan is in the high load state. Optionally, the opening threshold is 60%. The fan here refers to a fan of a thermal management system of the vehicle.

In a further embodiment, as shown in FIG. 2, the step of setting the output voltage of the DCDC converter according to a voltage level corresponding to the charging voltage boost demand in step S300 includes:

Step S304, the DCDC converter is controlled to output a voltage according to the voltage level corresponding to the occurring condition when one of the conditions of the catalytic converter being in the rapid heating demand state, the oil pump being in the high load demand state, and the fan being in the high load state occurs.

Step S306, the DCDC converter is controlled to output a voltage according to a highest voltage level among the voltage levels corresponding to the occurring conditions when at least two of the conditions of the catalytic converter being in the rapid heating demand state, the oil pump being in the high load demand state, and the fan being in the high load state occur.

In an embodiment, the voltage level corresponding to the catalytic converter being in the rapid heating demand state is lower than the voltage level corresponding to the oil pump being in the high load demand state. The voltage level corresponding to the oil pump being in the high load demand state is the same as the voltage level corresponding to the fan being in the high load state. A corresponding output voltage can be determined according to the voltage level.

For example, both the voltage levels corresponding to the oil pump being in the high load demand state and the fan being in the high load state are set to 3, and the corresponding output voltage of the DCDC converter is 15.2 V; the voltage level corresponding to the catalytic converter being in the rapid heating demand state is set to 2, and the corresponding output voltage of the DCDC converter is 14 V. Of course, the voltage levels are not limited to the above two, but can further include level 0 and level 1, which correspond to 12.2 to 15 V (that is, the above normal target voltage) and 13.6 V, respectively, to deal with other vehicle states. The classification of voltage levels is not limited to this, and there is no restriction here.

The present invention further provides a DCDC output voltage control system for a hybrid electric vehicle, including a control unit. The control unit includes a memory and a processor, and the memory storing a control program that, when executed by the processor, is used to implement the DCDC output voltage control method according to any one or a combination of the above embodiments. The processor may be a central processing unit (CPU), or a digital processing unit, etc. The processor transmits and receives data through a communication interface. The memory is configured to store programs executed by the processor. The memory is any medium that can be used to carry or store desired program codes in the form of instructions or data structures and that can be accessed by a computer, and can also be a combination of a plurality of memories. The aforementioned computer program may be downloaded from a computer-readable storage medium to a corresponding computing/processing device or downloaded to a computer or an external storage device via a network (such as the Internet, a local area network, a wide area network, and/or a wireless network).

Figure 3:
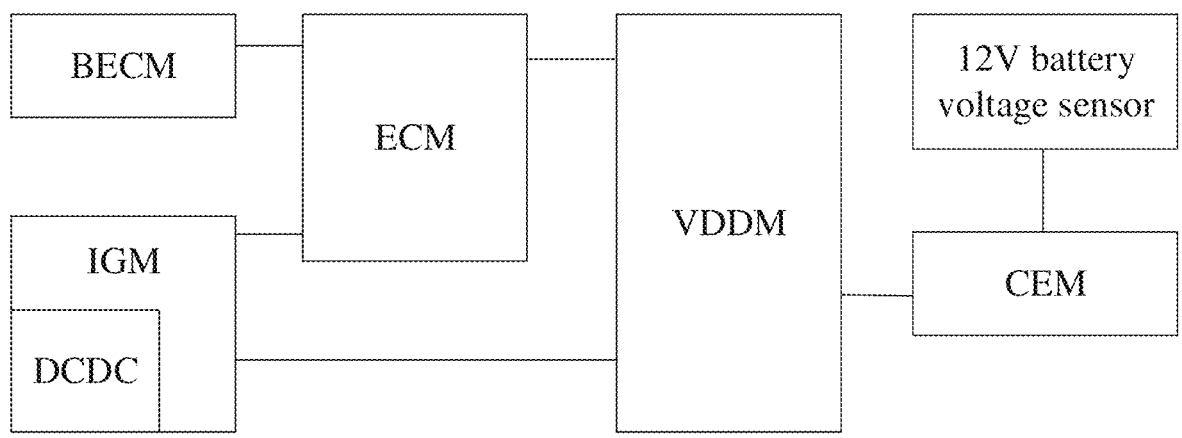
FIG. 3 is a schematic diagram of a DCDC output voltage control system according to an embodiment of the present invention.

FIG. 3 is a schematic diagram of a DCDC output voltage control system according to an embodiment of the present invention. In an embodiment, as shown in FIG. 3, the hybrid electric vehicle includes a power battery energy control module (BECM), an engine electronic control module (ECM), a motor controller (IGM), a gateway (VDDM), a vehicle electronics controller (CEM) and a 12 V battery voltage sensor.

The engine electronic control module is in communication connection with the power battery energy control module, and can acquire, through the battery energy control module, information about whether a main relay of a high-voltage battery is pulled in. For example, the engine electronic control module sends a high-voltage battery pull-in request to the power battery energy control module, and determines that the main relay of the high-voltage battery has been pulled in when receiving pulled-in information fed back by the power battery energy control module.

The engine electronic control module is also in communication connection with the motor controller, and sends a DCDC enable request to the motor controller. The motor controller is configured to monitor whether the DCDC converter is in an enable state and feed enable state information back to the engine electronic control module. After receiving state information that the DCDC converter has been enabled, the engine electronic control module determines a voltage level of the DCDC converter according to the state of the vehicle. The engine electronic control module is further configured to send the voltage level to the vehicle electronics controller through the gateway so that the vehicle electronics controller sets an output voltage of the DCDC converter according to a battery state fed back by the 12 V battery voltage sensor and the voltage level, and to forward the set output voltage to the motor controller through the gateway so that the motor controller controls the DCDC converter to output a voltage according to the set output voltage.

So far, it should be recognized by those skilled in the art that although exemplary embodiments of the present invention have been exhaustively shown and described herein, many other variations or modifications consistent with principles of the present invention can be directly identified or deduced from the present disclosure of the present invention without departing from the spirit and scope of the present invention. Therefore, the scope of the present invention should be understood and deemed as covering all these variations or modifications.

What is claimed is:

1. A DCDC output voltage control method for a hybrid electric vehicle, the vehicle comprising a DCDC converter for converting a voltage of a high-voltage battery into a low voltage used for a low-voltage load of the vehicle in a buck operation mode and outputting the low voltage, the method comprising:
    when the DCDC converter is in the buck operation mode, determining whether the vehicle is in a high power output demand state or an abnormal engine flame-out state;
    if so, setting an output voltage of the DCDC converter to a normal target voltage, so as to control the DCDC converter to output according to the normal target voltage;
    otherwise, determining whether the low-voltage load has a charging voltage boost demand, and when the low-voltage load has the charging voltage boost demand and an electric quantity of the high-voltage battery is greater than an electric quantity threshold, setting the output voltage of the DCDC converter according to a voltage level corresponding to the charging voltage boost demand, so as to meet a charging demand of the low-voltage load.

2. The DCDC output voltage control method according to claim 1, wherein before the step of, when the DCDC converter is in the buck operation mode, determining whether the vehicle is in a high power output demand state or an abnormal engine flame-out state, the method further comprises:
    determining whether the vehicle is in a DCDC enable state; and
    when the vehicle is in the enable state and receives a buck request instruction, controlling the DCDC converter to prepare for voltage conversion, performing timing, and controlling the DCDC converter to switch to the buck operation mode when the time arrives at a preset delay time.

3. The DCDC output voltage control method according to claim 2, wherein the step of determining whether the vehicle is in a DCDC enable state comprises:
    determining that the DCDC converter is in a pre-enable state when the high-voltage battery of the vehicle is in a state of being able to supply power, the vehicle receives a start request instruction, the high-voltage battery is in a state of being able to maintain a preset electric quantity, the DCDC converter is in a state of being able to normally transmit and receive signals, and a high-voltage system is not faulty; and
    determining that the DCDC converter is in the enable state when the DCDC converter is in the pre-enable state, an ignition signal is received and it is determined that a motor of the vehicle is not faulty.

4. The DCDC output voltage control method according to claim 1, wherein
    the high power output demand state comprises at least one of an initiation start state, a full-throttle acceleration state, an operating high-throttle start state and a crawling start in-gear state.

5. The DCDC output voltage control method according to claim 4, wherein the step of determining whether the vehicle is in a high power output demand state comprises:
    determining that the vehicle is in the initiation start state when, in a same driving cycle, a first start time of an engine of the vehicle is less than a first limit or a non-first start time thereof is less than a second limit, wherein the first limit is greater than the second limit.

6. The DCDC output voltage control method according to claim 4, wherein the step of determining whether the vehicle is in a high power output demand state comprises:
    determining that the vehicle is in the full-throttle acceleration state when an opening of a throttle pedal of the vehicle is greater than a first opening limit, the vehicle is in a forward gear or a reverse gear, and the time when the opening of the throttle pedal is greater than the first opening limit is less than a third limit.

7. The DCDC output voltage control method according to claim 4, wherein the step of determining whether the vehicle is in a high power output demand state comprises:
    determining that the vehicle is in the operating high-throttle start state when the engine of the vehicle is in an operating state, a vehicle speed is less than a starting vehicle speed threshold, a reserve torque of the engine is less than a torque threshold, an opening of a throttle pedal of the vehicle is greater than a second opening limit, a difference between a maximum torque of the engine and a driver request torque is less than a difference threshold, and a current power of an air condition compressor is greater than a power limit.

8. The DCDC output voltage control method according to claim 4, wherein the step of determining whether the vehicle is in a high power output demand state comprises:
    determining that the vehicle is in the crawling start in-gear state when the engine of the vehicle is in an operating state, a starting time is less than a fourth limit, a vehicle speed is less than a starting vehicle speed threshold, a reserve torque of the engine is less than a torque threshold, opening information of a throttle pedal is not received, and the vehicle is in a forward gear or a reverse gear.

9. The DCDC output voltage control method according to claim 1, wherein the step of determining whether the vehicle is in an abnormal engine flame-out state comprises:
    determining that the vehicle is in the abnormal engine flame-out state when the engine of the vehicle is in an operating state, a rotation speed of the engine is less than a target idle speed and the absolute value of a difference between the two is greater than a rotation speed difference limit, a rotation speed acceleration of the engine is negative and the absolute value of the rotation speed acceleration is less than an acceleration limit, and a predicted rotation speed of the engine is less than a flame-out rotation speed threshold.

10. The DCDC output voltage control method according to claim 1, wherein the step of determining whether the low-voltage load has a charging voltage boost demand comprises:
    determining whether a catalytic converter of the vehicle is in a rapid heating demand state;
    determining whether an oil pump of the vehicle is in a high load demand state;
    determining whether a fan of the vehicle is in a high load state; and
    determining that the low-voltage load has the charging voltage boost demand when one or more conditions of the catalytic converter being in the rapid heating demand state, the oil pump being in the high load demand state, and the fan being in the high load state occur.

11. The DCDC output voltage control method according to claim 10, wherein the step of determining whether a catalytic converter of the vehicle is in a rapid heating demand state comprises:

determining that the catalytic converter is in the rapid heating demand state when the temperature of a coolant in the engine of the vehicle is higher than a temperature threshold, an upstream exhaust temperature of the catalytic converter is reliable, and the exhaust temperature is lower than an air temperature threshold.

12. The DCDC output voltage control method according to claim 10, wherein the step of determining whether an oil pump of the vehicle is in a high load demand state comprises:
   determining that the oil pump is in the high load demand state when a load of the oil pump is greater than a load threshold.

13. The DCDC output voltage control method according to claim 10, wherein the step of determining whether a fan of the vehicle is in a high load state comprises:
   determining that the fan is in the high load state when an opening of the fan is greater than an opening threshold.

14. The DCDC output voltage control method according to claim 10, wherein the step of setting the output voltage of the DCDC converter according to a voltage level corresponding to the charging voltage boost demand comprises:
   controlling the DCDC converter to output a voltage according to the voltage level corresponding to the occurring condition when one of the conditions of the catalytic converter being in the rapid heating demand state, the oil pump being in the high load demand state, and the fan being in the high load state occurs; or
   controlling the DCDC converter to output a voltage according to a highest voltage level among the voltage levels corresponding to the occurring conditions when at least two of the conditions of the catalytic converter being in the rapid heating demand state, the oil pump being in the high load demand state, and the fan being in the high load state occur.

15. The DCDC output voltage control method according to claim 14, wherein
   the voltage level corresponding to the catalytic converter being in the rapid heating demand state is lower than the voltage level corresponding to the oil pump being in the high load demand state; and
   the voltage level corresponding to the oil pump being in the high load demand state is the same as the voltage level corresponding to the fan being in the high load state.

16. A DCDC output voltage control system for a hybrid electric vehicle, comprising a control unit, the control unit comprising a memory and a processor, and the memory storing a control program that, when executed by the processor, is used to implement the DCDC output voltage control method according to claim 1.

\* \* \* \* \*